United States Patent
Farinella et al.

(10) Patent No.: US 9,631,740 B2
(45) Date of Patent: Apr. 25, 2017

(54) FAUCET HANDLE WITH VALVE CARTRIDGE PARALLEL TO MOUNTING SURFACE

(71) Applicant: WATERWORKS IP Co., LLC., Danbury, CT (US)

(72) Inventors: Kevin Farinella, Danbury, CT (US); Robert Sallick, Danbury, CT (US)

(73) Assignee: Waterworks IP Co., Ltd., Danbury, CT (US)

( * ) Notice: Subject to any disclaimer, the term of this patent is extended or adjusted under 35 U.S.C. 154(b) by 0 days.

(21) Appl. No.: 13/843,130

(22) Filed: Mar. 15, 2013

(65) Prior Publication Data
US 2014/0091245 A1 Apr. 3, 2014

Related U.S. Application Data

(60) Provisional application No. 61/706,857, filed on Sep. 28, 2012.

(51) Int. Cl.
| | | |
|---|---|---|
| *A47K 1/00* | (2006.01) | |
| *E03C 1/04* | (2006.01) | |
| *F16K 31/44* | (2006.01) | |
| *F16K 5/00* | (2006.01) | |
| *F15B 13/00* | (2006.01) | |
| *F16K 21/00* | (2006.01) | |

(Continued)

(52) U.S. Cl.
CPC ............ *F16K 31/60* (2013.01); *E03C 1/0412* (2013.01); *F16K 1/04* (2013.01); *F16K 5/0492* (2013.01);
(Continued)

(58) Field of Classification Search
CPC ........ F16K 19/00; F16K 31/60; F16K 31/602; F16K 11/207; F16K 19/006; E03C 1/401;
(Continued)

(56) References Cited

U.S. PATENT DOCUMENTS

| | | |
|---|---|---|
| 4,557,288 A | 12/1985 | Botnick |
| 4,995,121 A | 2/1991 | Barker |

(Continued)

FOREIGN PATENT DOCUMENTS

| | | |
|---|---|---|
| CN | 101016954 A | 8/2007 |
| CN | 201447361 U | 5/2010 |

(Continued)

OTHER PUBLICATIONS

Notification of Transmittal of the International Search Report and the Written Opinion of the International Searching Authority, or the Declaration issued in PCT/US13/32331 dated Jun. 28, 2013.

(Continued)

*Primary Examiner* — Mary McManmon
*Assistant Examiner* — Hailey K Do
(74) *Attorney, Agent, or Firm* — Lewis Roca Rothgerber Christie LLP

(57) ABSTRACT

A faucet handle includes a fluid supply line, fluid return line, and valve cartridge. A first portion of the valve cartridge provides a connecting passage between fluid supply line and fluid return line and allows fluid flow when the valve cartridge is open. A valve body having first and second openings houses the first portion of the valve cartridge. A second portion of the valve cartridge extends through first opening and extends from first portion to second portion in a direction that is substantially parallel to a mounting surface. A control handle contacts second portion of the valve cartridge. When control handle is rotated in a first direction around an axis along which the valve cartridge extends the valve cartridge is opened allowing flow from supply line to return line, and when the valve cartridge is rotated around the axis in an opposing direction the valve cartridge is closed.

18 Claims, 4 Drawing Sheets

(51) Int. Cl.
  *F16K 31/60* (2006.01)
  *F16K 11/00* (2006.01)
  *F16K 11/20* (2006.01)
  *F16K 1/04* (2006.01)
  *F16K 5/04* (2006.01)

(52) U.S. Cl.
  CPC .......... *F16K 11/207* (2013.01); *F16K 19/006* (2013.01); *F16K 31/602* (2013.01); *Y10T 137/9464* (2015.04)

(58) Field of Classification Search
  CPC .......... E03C 1/412; E03C 1/04; E03C 1/0412; Y10T 137/9464; Y10T 137/8807
  USPC ................. 251/309–311, 231, 304; 137/594, 137/625.22–625.24, 625.47, 801, 675, 137/678; 4/676, 626
  See application file for complete search history.

(56) References Cited

U.S. PATENT DOCUMENTS

| | | | |
|---|---|---|---|
| 5,871,029 A * | 2/1999 | Peteri | E03C 1/0404 137/615 |
| 6,298,875 B1 * | 10/2001 | Warshawsky et al. | 137/606 |
| 6,757,921 B2 | 7/2004 | Esche | |
| 6,981,286 B2 | 1/2006 | Sallick | |
| 7,264,016 B2 | 9/2007 | Molina et al. | |
| 7,533,683 B2 | 5/2009 | Ortega et al. | |
| 7,814,927 B2 | 10/2010 | Hansen | |
| 8,136,552 B2 * | 3/2012 | Carignan et al. | 137/625.4 |
| 8,671,979 B2 * | 3/2014 | Gioira et al. | 137/599.14 |
| 2007/0145319 A1 * | 6/2007 | Hoernig | 251/248 |
| 2008/0276367 A1 | 11/2008 | Bares et al. | |
| 2010/0170577 A1 * | 7/2010 | Liu | E03C 1/0403 137/315.01 |
| 2011/0079307 A1 | 4/2011 | Marty et al. | |
| 2011/0094604 A1 | 4/2011 | Thomas et al. | |
| 2011/0303305 A1 * | 12/2011 | Chen | 137/606 |

FOREIGN PATENT DOCUMENTS

| | | |
|---|---|---|
| JP | H0798069 A | 4/1995 |
| WO | 2008086379 A1 | 7/2008 |

OTHER PUBLICATIONS

Office Action issued Jan. 26, 2016, in related Chinese Application No. 201380052741.8 (English Translation provided).

\* cited by examiner

FAUCET HANDLE WITH VALVE CARTRIDGE PARALLEL TO MOUNTING SURFACE

CROSS REFERENCE TO RELATED APPLICATION

The benefit of priority under 35 U.S.C. §120 of U.S. Provisional Patent Application No. 61/706,857 filed on Sep. 28, 2012 is claimed, the disclosure of which is incorporated herein by reference in its entirety.

FIELD OF THE INVENTION

The present disclosure is directed to faucet handles for controlling fluid flow.

BACKGROUND

Other faucet handles comprise a valve cartridge in line with the axial direction of substantially cylindrical valve bodies, so the axis of rotation of the valve is perpendicular to the mounting surface. Service or removal by unthreading of the valve cartridge may cause the valve body to rotate around its axis.

Other faucets that have handles that rotate about an axis parallel to a mounting surface have integrated spouts. Some faucets have two opposing valve cartridges and an integrated spout. This creates a large, bulky aesthetic because of these added components.

SUMMARY

There exists a need for a faucet handle in which the valve cartridge can be removed without causing the valve body to rotate around its axis. There exists a need for a compact faucet handle that communicates with a separate spout.

These and other needs are met by embodiments of the present disclosure, including a faucet handle configured to be mounted to a mounting surface wherein the faucet handle comprises a fluid supply line, a fluid return line, and a valve cartridge. A first portion of the valve cartridge provides a connecting passage between the fluid supply line to the fluid return line and allows fluid to flow from the fluid supply line to the fluid return line when the valve cartridge is in an open position. The faucet handle further comprises a valve body having a first opening and a second opening. The valve body houses the first portion of the valve cartridge. A second portion of the valve cartridge extends through the first opening of the valve body. The valve cartridge extends from the first portion to the second portion in a direction that is substantially parallel to the mounting surface. A control handle contacts the second portion of the valve cartridge. When the control handle is rotated in a first direction around an axis along which the valve cartridge extends from the first portion to the second portion the valve cartridge is opened, thereby allowing fluid flow from the supply line to the return line. When the valve cartridge is rotated around the axis in a second direction opposing the first direction the valve cartridge is closed, thereby preventing fluid flow from the supply line to the return line.

In certain embodiments of the disclosure, the valve body further houses the supply line and return line, and the supply line and return line extend through the second opening. The second opening can be oriented substantially perpendicular to the first opening.

In certain embodiments of the disclosure, the control handle further comprises an open end which houses the second portion of the valve cartridge.

In certain embodiments of the disclosure, the valve body and valve cartridge are configured so that the valve cartridge rotates around an axis substantially parallel to the mounting surface.

In certain embodiments of the disclosure, the valve body has a first dimension along the direction in which the supply line and return line extend, and a second dimension along the direction in which the valve cartridge extends, and the valve cartridge rotates around an axis that is substantially perpendicular to the first dimension. The valve body can be substantially cylindrical-shaped and the first dimension extends along an axial direction of the substantially cylindrical-shaped valve body and the second dimension extends along a radial direction of the substantially cylindrical-shaped valve body.

In certain embodiments of the disclosure, the first dimension of the valve body is longer than the second dimension of the valve body.

In certain embodiments of the disclosure, the faucet handle further comprises a mounting flange configured to secure the valve body to the mounting surface.

In certain embodiments of the disclosure, a valve cartridge seat is located between the supply line and the valve cartridge.

The faucet handle of the disclosure invention eliminates the integration of the spout component and provides the flexibility to supply water to a spout, showerhead, handshower, or any other type of end user fitting.

DETAILED DESCRIPTION

The present disclosure allows a valve cartridge to be supplied with a fluid, such as water, that passes through a mounting surface and then through a valve cartridge, operated by a control handle that rotates about an axis parallel to the mounting surface, and then delivers the water back through the mounting surface.

Mounting variations of the faucet handle can be achieved through interaction between the mounting flange and any additional mounting components needed for the specific mounting surface. For example, the present faucet handle can be mounted on walls, decks, floors, or ceilings, etc. Mounting flanges of any suitable size and shape that are sufficient to support the valve body can be used with the faucet handle of the present disclosure. According to the present disclosure, fluid, such as water is ported through a single stand of no greater diameter than that of the valve body. In other embodiments of the disclosure, the valve body is integrated with the mounting flange to form an integral body.

Figure 1:
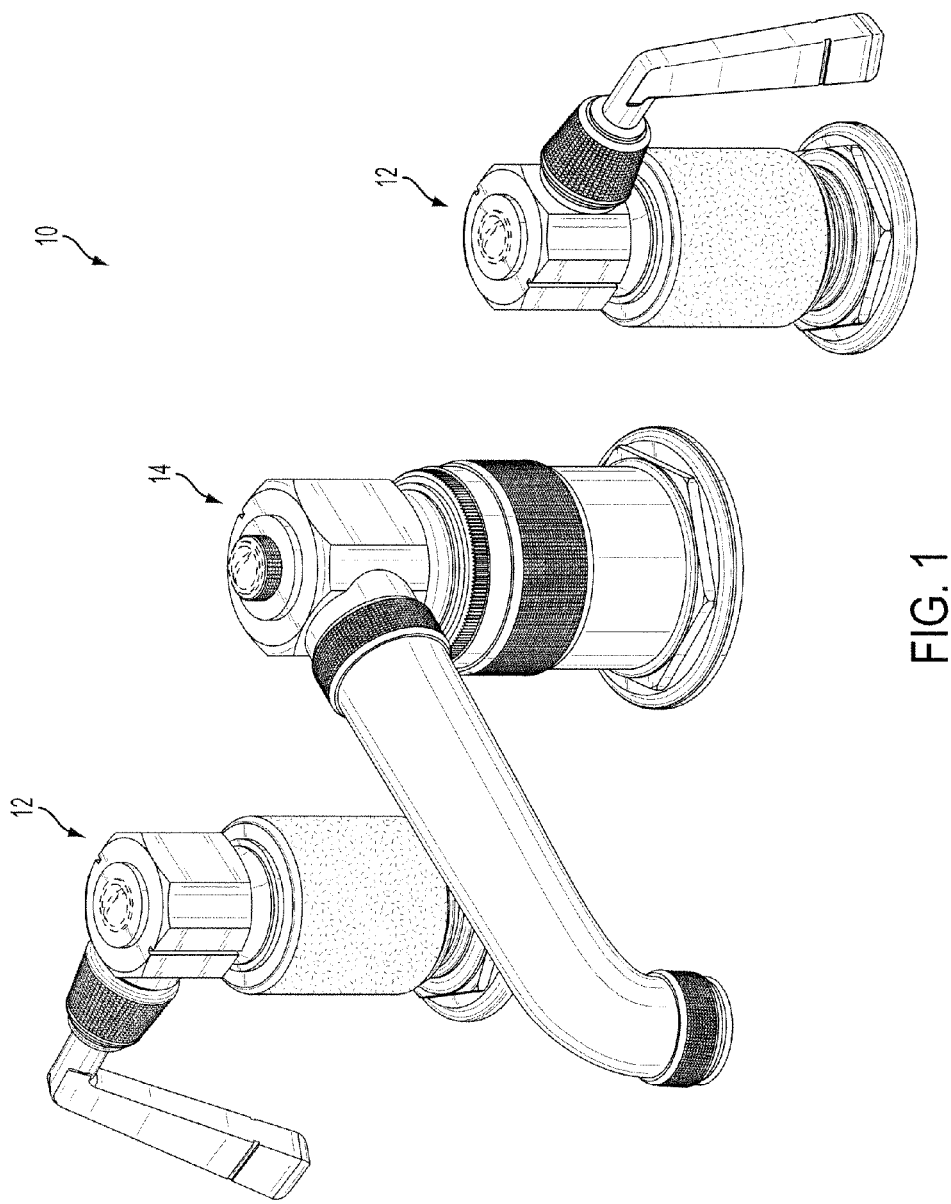
FIG. 1 is an isometric view of a three-hole faucet including a faucet handle according to an embodiment of the present disclosure.

FIG. 1 shows a three-hole faucet set 10 including a faucet handle 12 according to an embodiment of the present disclosure. The faucet set 10 includes two faucet handles 12, a hot water faucet handle and a cold water faucet handle, and a spout 14. The faucet handles control the amount of hot and cold water that flows through the spout 14. In the illustrated embodiment, water would flow through a mounting surface, into the faucet handle 12, through a valve cartridge, out of the faucet handle, back through the mounting surface, through a different portion of the mounting surface where the spout 14 is mounted, and out through the spout 14.

Figure 2:
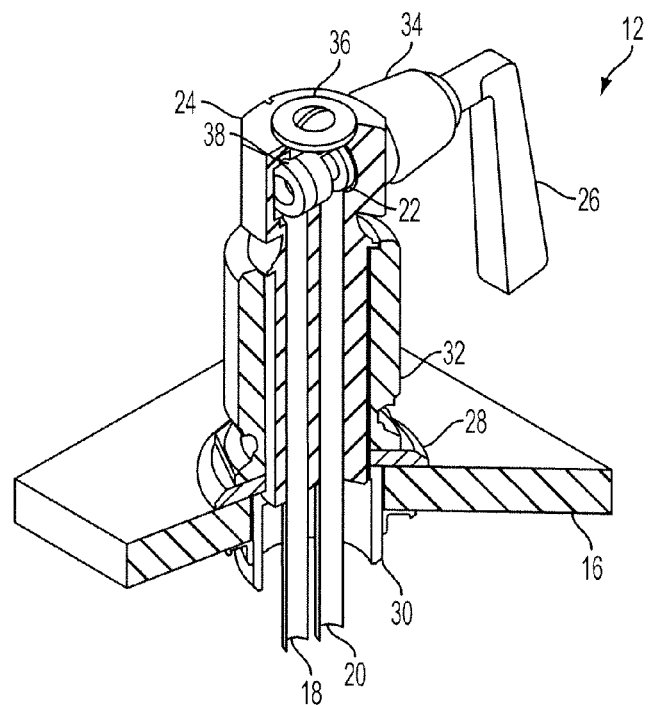
FIG. 2 is a cut-away view of a faucet handle in the closed position according to an embodiment of the present disclosure mounted on a mounting surface.

FIG. 2 illustrates a faucet handle 12 in the closed position according to an embodiment of the present disclosure mounted on a mounting surface 16. A fluid, such as water, enters a valve body 24 via the fluid supply line 18. A valve cartridge 22 is housed within the valve body 24. A first portion of the valve cartridge 22 is located in the valve body 24 and a second portion of the valve cartridge 22 extends through a first opening of the valve body 24. The second portion of the valve cartridge 22 is housed in an open end 34 of the control handle 26. The valve cartridge 22 contacts the control handle 26. The control handle 26 is in the closed position, so water does not flow to the fluid return line 20. A valve cartridge seat 38 is located between the fluid supply line 18 and the valve cartridge 22. The valve cartridge seat 38 provides a sealing surface for the valve cartridge 22.

The outer surface of the open end 34 of the control handle 26 can have a decorative finish. Likewise the valve body 24 can be surrounded by a decorative outer shell 32. The valve body 24 is mounted to a mounting surface 16 with a mounting flange 28. In addition, supplemental mounting components 30 can be included in certain embodiments to secure the faucet handle 12 to the mounting surface 16. The mounting surface 16 can be any surface capable of supporting the faucet handle 12, and the faucet handle 12 can be mounted in any orientation. As the valve cartridge 22 is positioned to extend substantially parallel to the mounting surface 16, a screw and washer combination 36 on top of the valve body 24 is for decoration, rather than acting as a fastener.

Figure 3:
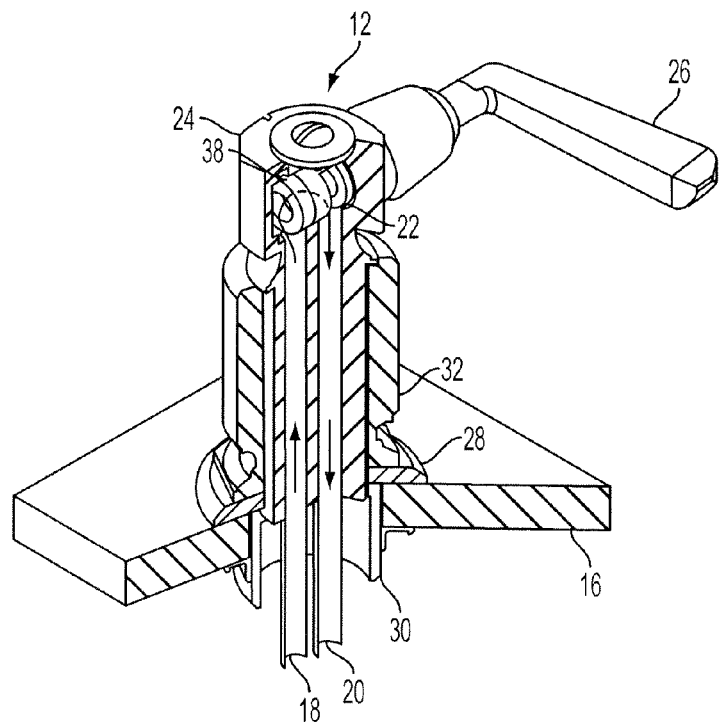
FIG. 3 is a cut-away view of a faucet handle in the open position according to an embodiment of the present disclosure mounted on a mounting surface.

FIG. 3 shows the faucet handle 12 in the open position. When the control handle 26 is rotated around an axis along which the valve cartridge 22 extends, the valve 22 rotates with the handle 26 into an open position and fluid flows from the fluid supply line 18 through the first portion of the valve cartridge 22 to the fluid return line 20 as shown by the arrows. The valve cartridge 22 is fitted with a rubber face washer seal (not shown) that when in contact with the valve cartridge seat 38 creates a connecting passage to guide the fluid flow through the valve cartridge 22. The fluid return line 20 is connected to a fluid exit port, such as a spout 14.

Figure 4:
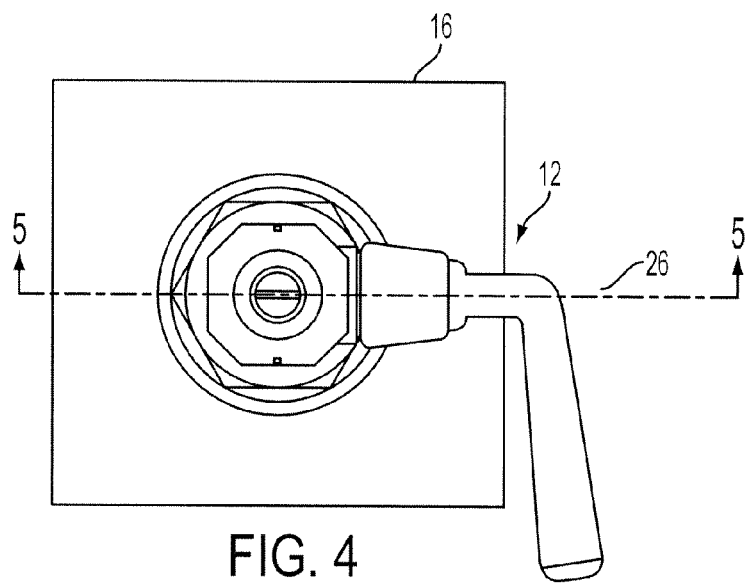
FIG. 4 is a plan view of a faucet handle in the open position according to an embodiment of the present disclosure.
Figure 5:
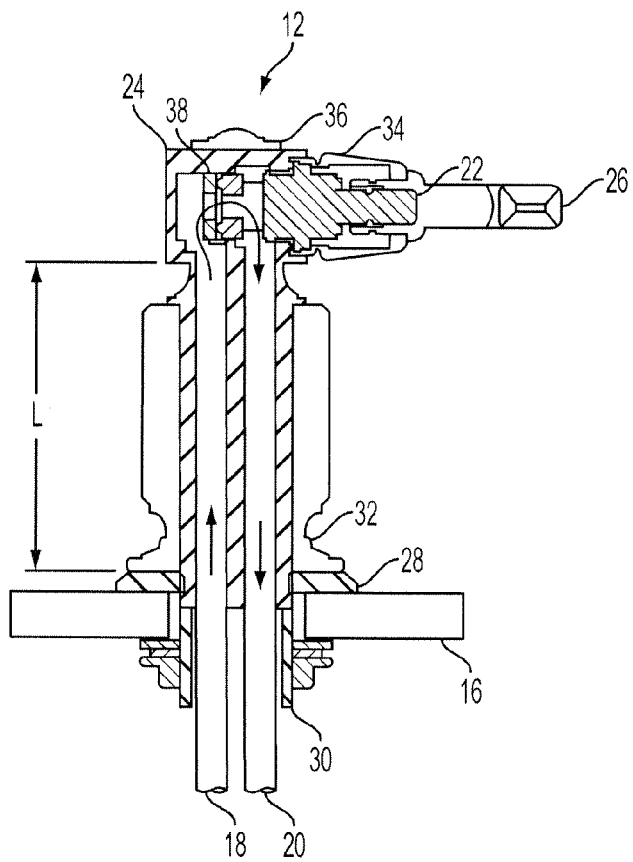
FIG. 5 is a cut-away view of a section A-A of faucet handle in the open position according to an embodiment of the present disclosure.

FIG. 4 is a plan view of the faucet handle 12 in the open position according to an embodiment of the disclosure. FIG. 5 is a cut-away view of a section A-A of the faucet handle 12 in the open position showing the path of fluid from the fluid supply line 18 through the open valve cartridge 22 to the fluid return line 20. The valve body 24 can be any suitable length L depending upon design considerations.

Figure 6:
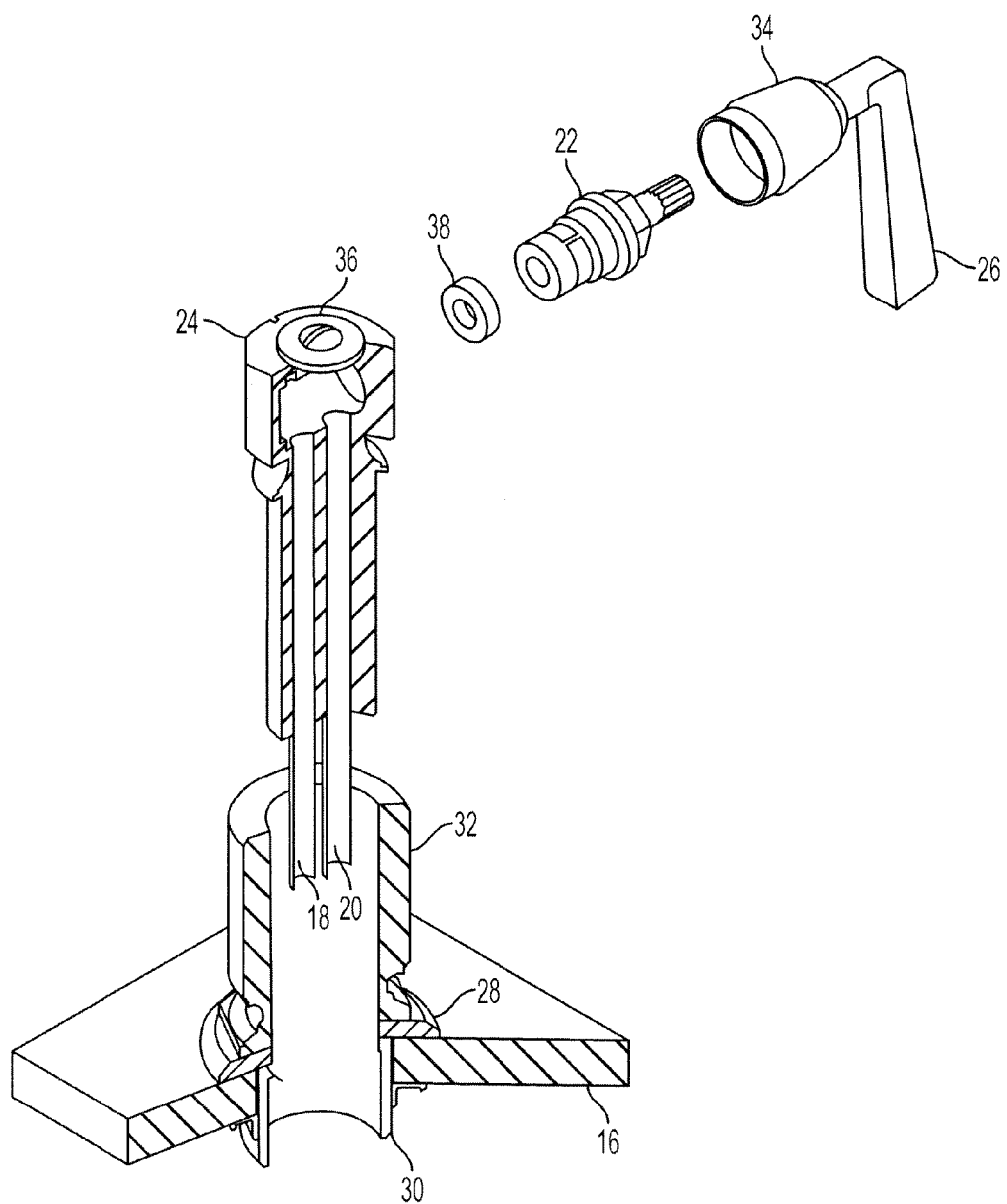
FIG. 6 is an exploded view of a faucet handle according to an embodiment of the present disclosure.

As shown in FIG. 6, the valve body 24 is substantially cylindrical-shaped in certain embodiments of the disclosure. The valve body 24 has a first dimension along the direction which the supply line 18 and return line 20 extend, and a second dimension along which the valve cartridge 22 extends, and the cartridge valve 22 rotates around an axis that is substantially perpendicular to the first dimension. In certain embodiments, the first dimension extends along an axial direction of the substantially cylindrical-shaped valve body 24 and the second dimension extends along a radial direction of the substantially cylindrical-shaped valve body 24. In certain embodiments, the first dimension is longer than the second dimension.

Further, as shown in FIG. 6, in certain embodiments, the valve body 24 is surrounded by a decorative outer housing 32. In addition, in certain embodiments, the first opening of the valve body 24 through which the valve cartridge 22 extends is oriented substantially perpendicular to the second opening through which the supply line 18 and return line 20 extend.

In certain embodiments of the present disclosure, a portion of the valve body 24 is configured to securely hold the valve cartridge 22 and valve cartridge seat 38 in place, while allowing the first portion of the valve cartridge 22 to rotate from an open to closed position and vice-versa. In addition, the open end 34 of the control handle 26 is configured to engage the second portion of the valve cartridge 22, so that the valve cartridge 22 rotates about a rotation axis of the control handle 26. An end of the second portion of the valve cartridge 22 can be configured so that it matingly engages with a complementarily configured portion in the open end 34 of the control handle 26. In other embodiments, the end of the second portion of the valve cartridge 22 and an internal portion of the open end 34 of the control handle 26 can be threaded so that the valve cartridge 22 and the control handle 26 are fixed to each other via the threads (not shown).

While other faucet handles have a valve cartridge in line with the axial direction of substantially cylindrical valve bodies, so that the axis of rotation of the valve is perpendicular to the mounting surface, faucet handles according to the present disclosure arrange the valve cartridge to be substantially perpendicular to the axial direction of the substantially cylindrical valve body. Service or removal by unthreading of the cartridge of other faucet handles may cause the valve body to rotate around its axis. An advantage of the present disclosure is that the configuration of the faucet handle of the present disclosure allows cartridge removal to be perpendicular to the axial direction of the substantially cylindrical valve body. Thus, when unthreading the cartridge of the present disclosure rotation of the valve body relative to the mounting surface is prevented. This allows a firm contact between the valve body and the mounting surface to be maintained when servicing or replacing the cartridge.

Another advantage of the faucet handles according to the present disclosure is that the valve cartridge is easily accessible and removal or loosening of the valve body is not required to service or remove the cartridge. The present faucet handle can be mounted to a wide variety of mounting surfaces in a wide variety of orientations. Further, the faucet handle of the present disclosure allows the valve body to be installed at any height above the mounting surface. Thus a wide variety of faucet handle designs and configurations are provided by the present faucet handle.

The embodiments illustrated in the instant disclosure are for illustrative purposes only. They should not be construed to limit the claims. As is clear to one of ordinary skill in the art, the instant disclosure encompasses a wide variety of embodiments not specifically illustrated herein. While the devices and methods of this disclosure have been described in terms of exemplary embodiments, it will be apparent to those of skill in the art that variations may be applied to the devices and methods and in the steps or in the sequence of steps of the method described herein without departing from the concept, spirit and scope of the invention.

What is claimed is:

1. A faucet handle configured to be mounted to a mounting surface, the faucet handle comprising:
    a fluid supply tube;
    a fluid return tube;
    a valve cartridge, a first portion of the valve cartridge providing a connecting passage between the fluid supply tube to the fluid return tube and allowing fluid to flow from the fluid supply tube to only the fluid return tube when the valve cartridge is in an open position;
    a valve body, having a first opening and a second opening, housing the first portion of the valve cartridge, wherein a second portion of the valve cartridge extends through the first opening of the valve body, the valve cartridge extends from the first portion to the second portion in a first direction that is substantially parallel to the mounting surface, and the valve body houses the fluid supply tube and fluid return tube, and the fluid supply tube and fluid return tube extend through the second opening, wherein the fluid return tube is directly connected to the first portion of the valve cartridge, and the fluid return tube extends from the point of connection with the valve cartridge in a second direction substantially perpendicular to the first direction; and
    a control handle contacting the second portion of the valve cartridge, wherein when the control handle is rotated in a third direction around an axis along which the valve cartridge extends from the first portion to the second portion the valve cartridge is opened, thereby allowing fluid flow from the fluid supply tube to only the fluid return tube, and when the valve cartridge is rotated around the axis in a fourth direction opposing the third direction the valve cartridge is closed, thereby preventing fluid flow.

2. The faucet handle according to claim 1, wherein the second opening is oriented substantially perpendicular to the first opening.

3. The faucet handle according to claim 1, wherein the control handle further comprises an open end which houses the second portion of the valve cartridge.

4. The faucet handle according to claim 1, wherein the valve body and valve cartridge are configured so that the valve cartridge rotates around an axis substantially parallel to the mounting surface.

5. The faucet handle according to claim 1, further comprising a valve cartridge seat located between the fluid supply tube and the valve cartridge.

6. The faucet handle according to claim 1, further comprising a mounting flange configured to secure the valve body to the mounting surface.

7. The faucet handle according to claim 1, wherein fluid flows along a fifth direction in the fluid supply tube and flows along a sixth direction in the fluid return tube, wherein the sixth direction is substantially an opposite direction from the fifth direction.

8. The faucet handle according to claim 1, wherein the valve body has a first dimension along the direction which the fluid supply tube and fluid return tube extend, and a second dimension along which the valve cartridge extends, and the valve cartridge rotates around an axis that is substantially perpendicular to the first dimension.

9. The faucet handle according to claim 8, wherein the valve body is substantially cylindrical-shaped and the first dimension extends along an axial direction of the substantially cylindrical-shaped valve body and the second dimension extends along a radial direction of the substantially cylindrical-shaped valve body.

10. The faucet handle according to claim 8, wherein the first dimension is longer than the second dimension.

11. A faucet, comprising:
    a discharge device; and
    a faucet handle configured to be mounted to a mounting surface, wherein the faucet handle comprises:
        a fluid supply tube;
        a fluid return tube;
        a valve cartridge, a first portion of the valve cartridge providing a connecting passage between the fluid supply tube to the fluid return tube and allowing fluid to flow from the fluid supply tube to the fluid return tube when the valve cartridge is in an open position;
        a valve body, having a first opening and a second opening, housing the first portion of the valve cartridge, wherein a second portion of the valve cartridge extends through the first opening of the valve body, the valve cartridge extends from the first portion to the second portion in a first direction that is substantially parallel to the mounting surface, and the valve body houses the fluid supply tube and fluid return tube, and the fluid supply tube and fluid return tube extend through the second opening, wherein the fluid return tube is directly connected to the first portion of the valve cartridge, and the fluid return tube extends from the point of connection with the valve cartridge in a second direction substantially perpendicular to the first direction; and
    a control handle contacting the second portion of the valve cartridge, wherein when the control handle is rotated in a third direction around an axis along which the valve cartridge extends from the first portion to the second portion the valve cartridge is opened, thereby allowing fluid flow from the fluid supply tube to the fluid return tube, and when the valve cartridge is rotated around the axis in a fourth direction opposing the third direction the valve cartridge is closed, thereby preventing fluid flow,
    wherein the discharge device is spaced apart from the faucet handle.

12. The faucet according to claim 11, wherein the fluid flows along a fifth direction in the fluid supply tube in the faucet handle and flows along a sixth direction in the fluid return tube in the faucet handle, wherein the sixth direction is substantially an opposite direction from the fifth direction.

13. The faucet according to claim 11, wherein the valve body further houses the fluid supply tube and fluid return tube, and the fluid supply tube and fluid return tube extend through the second opening.

14. The faucet according to claim 11, wherein the valve body and valve cartridge are configured so that the valve cartridge rotates around an axis substantially parallel to the mounting surface.

15. The faucet according to claim 11, further comprising a second faucet handle spaced apart from the discharge device.

16. The faucet according to claim 15, wherein the second faucet handle comprises:
    a fluid supply tube;
    a fluid return tube;

a valve cartridge, a first portion of the valve cartridge providing a connecting passage between the fluid supply tube to the fluid return tube and allowing fluid to flow from the fluid supply tube to the fluid return tube when the valve cartridge is in an open position;

a valve body, having a first opening and a second opening, housing the first portion of the valve cartridge, wherein a second portion of the valve cartridge extends through the first opening of the valve body, and the valve cartridge extends from the first portion to the second portion in a first direction that is substantially parallel to the mounting surface; and a control handle contacting the second portion of the valve cartridge, wherein when the control handle is rotated in a third direction around an axis along which the valve cartridge extends from the first portion to the second portion the valve cartridge is opened, thereby allowing fluid flow from the fluid supply tube to the fluid return tube, and when the valve cartridge is rotated around the axis in a fourth direction opposing the third direction the valve cartridge is closed, thereby preventing fluid flow.

17. The faucet according to claim 11, wherein the valve body has a first dimension along the direction which the fluid supply tube and fluid return tube extend, and a second dimension along which the valve cartridge extends, and
wherein the valve body is substantially cylindrical-shaped and the first dimension extends along an axial direction of the substantially cylindrical-shaped valve body and the second dimension extends along a radial direction of the substantially cylindrical-shaped valve body.

18. The faucet according to claim 17, wherein the first dimension is longer than the second dimension.

* * * * *